(12) United States Patent
Okutani et al.

(10) Patent No.: US 11,897,556 B2
(45) Date of Patent: Feb. 13, 2024

(54) STEERING DEVICE

(71) Applicant: Isuzu Motors Limited, Tokyo (JP)

(72) Inventors: Junpei Okutani, Fujisawa (JP);
Haruyuki Hosoya, Yokohama (JP);
Kousuke Kawakami, Yokohama (JP)

(73) Assignee: Isuzu Motors Limited, Yokohama (JP)

( * ) Notice: Subject to any disclaimer, the term of this patent is extended or adjusted under 35 U.S.C. 154(b) by 333 days.

(21) Appl. No.: 16/642,930

(22) PCT Filed: Jul. 19, 2018

(86) PCT No.: PCT/JP2018/026996
§ 371 (c)(1),
(2) Date: Feb. 28, 2020

(87) PCT Pub. No.: WO2019/044236
PCT Pub. Date: Mar. 7, 2019

(65) Prior Publication Data
US 2020/0255062 A1    Aug. 13, 2020

(30) Foreign Application Priority Data

Aug. 30, 2017  (JP) ................................. 2017-165769

(51) Int. Cl.
*B62D 5/14* (2006.01)
*B62D 5/04* (2006.01)
*B62D 5/06* (2006.01)

(52) U.S. Cl.
CPC .............. *B62D 5/14* (2013.01); *B62D 5/046* (2013.01); *B62D 5/062* (2013.01)

(58) Field of Classification Search
CPC ........... B62D 5/046; B62D 5/062; B62D 5/14

USPC ......................................................... 180/422
See application file for complete search history.

(56) References Cited

U.S. PATENT DOCUMENTS

| 1,467,208 | A | * | 9/1923 | James | B62D 5/14 91/375 R |
| 1,467,209 | A | * | 9/1923 | James | B62D 5/14 91/2 |
| 1,944,999 | A | * | 1/1934 | Rayburn | B62D 5/14 418/258 |

(Continued)

FOREIGN PATENT DOCUMENTS

| CN | 101391621 | | 3/2009 | |
| CN | 102887168 | A * | 1/2013 | ............... B62D 5/06 |

(Continued)

OTHER PUBLICATIONS

WO 2006002790 English Translation of Description Retrieved from Espacenet (Year: 2022).*

(Continued)

*Primary Examiner* — Kevin Hurley
*Assistant Examiner* — Marlon A Arce

(57) ABSTRACT

The present invention reduces motor size in a steering device. To this end, this steering device (1) to be installed in a vehicle has: a power steering unit (12) positioned below the floor section (7) of the vehicle compartment (2); and a coaxial motor (20) which is provided directly above the power steering unit (12) and in a manner such that the output shaft thereof is coaxial with the input shaft of the power steering unit (12).

5 Claims, 2 Drawing Sheets

(56) References Cited

U.S. PATENT DOCUMENTS

| | | | | |
|---|---|---|---|---|
| 5,769,178 A * | 6/1998 | Kim | B62D 5/083 91/375 A |
| 6,102,150 A * | 8/2000 | Bohner | B62D 5/06 180/406 |
| 6,382,342 B1 * | 5/2002 | Peppler | B62D 5/092 180/407 |
| 6,938,721 B2 * | 9/2005 | Ono | B62D 5/003 180/444 |
| 7,004,279 B2 * | 2/2006 | Shitamitsu | B62D 5/0409 180/404 |
| 7,233,853 B2 * | 6/2007 | Hendron | B60T 13/662 700/83 |
| 7,735,595 B2 * | 6/2010 | Kogel | B62D 5/065 180/405 |
| 10,858,040 B2 * | 12/2020 | Hultén | B62D 6/008 |
| 2002/0144855 A1 * | 10/2002 | Zheng | B62D 5/003 180/446 |
| 2003/0146038 A1 * | 8/2003 | Mills | B62D 5/001 180/422 |
| 2004/0020706 A1 * | 2/2004 | Williams | B62D 5/092 180/443 |
| 2004/0020708 A1 * | 2/2004 | Szabela | B62D 5/092 180/446 |
| 2004/0138797 A1 * | 7/2004 | Yao | B62D 5/0463 180/443 |
| 2004/0211618 A1 * | 10/2004 | Ogawa | B62D 6/008 180/402 |
| 2004/0262072 A1 * | 12/2004 | Hara | B62D 1/163 180/402 |
| 2005/0051379 A1 * | 3/2005 | Nagase | B62D 5/046 180/443 |
| 2005/0242765 A1 * | 11/2005 | Ta | B62D 5/046 318/799 |
| 2007/0257461 A1 * | 11/2007 | Lutz | B62D 5/005 280/89 |
| 2010/0051375 A1 * | 3/2010 | Sherwin | B62D 7/159 701/41 |
| 2010/0147618 A1 * | 6/2010 | Osonoi | B62D 5/003 180/432 |
| 2015/0175199 A1 * | 6/2015 | Kuramochi | B60W 10/184 701/41 |
| 2015/0291208 A1 * | 10/2015 | Miyasaka | B62D 5/046 701/41 |
| 2016/0152260 A1 * | 6/2016 | Bang | B62D 5/14 180/422 |
| 2017/0361867 A1 * | 12/2017 | Lewis | B62D 5/006 |
| 2019/0100232 A1 * | 4/2019 | Tsukasaki | B62D 6/008 |
| 2019/0135332 A1 * | 5/2019 | Cimatti | B62D 5/0454 |
| 2019/0248409 A1 * | 8/2019 | Nishida | B62D 5/063 |
| 2020/0017137 A1 * | 1/2020 | Otto | B62D 5/001 |
| 2020/0023893 A1 * | 1/2020 | Naik | B62D 5/0466 |
| 2020/0059126 A1 * | 2/2020 | Takahashi | H02K 3/522 |
| 2020/0059127 A1 * | 2/2020 | Yamashita | H02K 3/522 |
| 2020/0070886 A1 * | 3/2020 | Wou | B62D 5/04 |
| 2020/0223496 A1 * | 7/2020 | Okutani | B62D 1/183 |
| 2020/0255049 A1 * | 8/2020 | Okutani | B62D 1/184 |
| 2020/0255056 A1 * | 8/2020 | Okutani | B62D 5/0415 |
| 2020/0255061 A1 * | 8/2020 | Okutani | B62D 5/0415 |
| 2020/0255062 A1 * | 8/2020 | Okutani | B62D 5/046 |
| 2020/0283058 A1 * | 9/2020 | Okano | B62D 5/0421 |
| 2020/0346683 A1 * | 11/2020 | Okutani | B62D 1/189 |
| 2020/0346684 A1 * | 11/2020 | Okutani | B62D 5/22 |
| 2020/0346685 A1 * | 11/2020 | Okutani | B62D 5/0415 |
| 2021/0024122 A1 * | 1/2021 | Walentowski | B62D 1/16 |
| 2021/0024126 A1 * | 1/2021 | Matsumura | B60R 16/0231 |
| 2021/0129898 A1 * | 5/2021 | Forte | B62D 5/001 |
| 2021/0214003 A1 * | 7/2021 | Watanabe | B62D 6/002 |
| 2021/0347411 A1 * | 11/2021 | Roat | B62D 5/0469 |
| 2022/0379949 A1 * | 12/2022 | Cho | B62D 3/12 |
| 2022/0396304 A1 * | 12/2022 | Büker | B62D 1/10 |

FOREIGN PATENT DOCUMENTS

| | | | | |
|---|---|---|---|---|
| CN | 108622181 A | * | 10/2018 | |
| CN | 111055917 A | * | 4/2020 | B62D 3/06 |
| CN | 111170225 A | * | 5/2020 | |
| CN | 111824251 A | * | 10/2020 | |
| CN | 101309825 | | 11/2021 | |
| DE | 4243267 A1 | * | 6/1994 | B62D 5/008 |
| DE | 10132259 A1 | * | 1/2003 | B62D 5/001 |
| DE | 102007053263 A1 | * | 5/2009 | B62D 5/062 |
| DE | 112014004342 | | 7/2016 | |
| DE | 102019119572 A1 | * | 1/2020 | B25D 15/0215 |
| GB | 215607 A | * | 5/1924 | |
| GB | 1116863 A | * | 6/1968 | |
| JP | 62-247973 | | 10/1987 | |
| JP | 11-507894 | | 7/1999 | |
| JP | 2004-090686 | | 3/2004 | |
| JP | 2004330878 A | * | 11/2004 | |
| JP | 2005-255001 | | 9/2005 | |
| JP | 2006-111141 | | 4/2006 | |
| JP | 2006-264622 | | 10/2006 | |
| JP | 2007-522019 | | 8/2007 | |
| JP | 2013-010380 | | 1/2013 | |
| JP | 2013010380 A | * | 1/2013 | |
| JP | 2014091441 A | * | 5/2014 | |
| JP | 6228929 B2 | * | 11/2017 | B62D 5/04 |
| KR | 20140141836 A | * | 12/2014 | |
| KR | 20200021662 A | * | 3/2020 | |
| KR | 20210101028 A | * | 8/2021 | |
| WO | WO-03055732 A1 | * | 7/2003 | B62D 5/001 |
| WO | WO-2006002790 A1 | * | 1/2006 | B62D 1/166 |
| WO | WO-2018099876 A1 | * | 6/2018 | |
| WO | WO 2019/044236 | | 3/2019 | |

OTHER PUBLICATIONS

JP 2014091441 English Translation of Description Retrieved from Espacenet (Year: 2022).*

JP 2013010380 English Translation of Description Retrieved from Espacenet (Year: 2022).*

JP 2004330878 English Translation of Description Retrieved from Espacenet Dec. 2022 (Year: 2022).*

International Search Report and the Written Opinion dated Sep. 25, 2018 From the International Searching Authority Re. Application No. PCT/JP2018/026996 and Its Translation of Search Report Into English. (8 Pages).

* cited by examiner

STEERING DEVICE

TECHNICAL FIELD

The present disclosure relates to a steering device mounted on a vehicle.

BACKGROUND ART

Patent Literature (hereinafter, referred to as "PTL") 1 discloses a steering device provided with a power steering unit for amplifying a rotational force of a steering shaft, in which a motor for applying the rotational force to the steering shaft is provided, for example.

CITATION LIST

Patent Literature

PTL 1
Japanese Unexamined Patent Application Publication (Translation of PCT Application) No. 2007-522019

SUMMARY OF INVENTION

Technical Problem

However, in the configuration of PTL 1, the motor is driven also to substitute for the failure of the power steering unit, and uses a worm wheel mechanism to convert the rotational force, so that it is necessary to provide a higher-output and larger-sized motor.

An object of the present disclosure is to provide a steering device in which the motor can be miniaturized.

Solution to Problem

The steering device according to one aspect of the present disclosure is a steering device to be mounted on a vehicle, the steering device including: a power steering unit disposed below a floor of a vehicle cabin; and a coaxial motor provided directly above the power steering unit and including an output shaft arranged coaxially with an input shaft of the power steering unit.

Advantageous Effects of Invention

According to the present disclosure, the motor can be miniaturized.

DESCRIPTION OF EMBODIMENT

Hereinafter, an embodiment of the present disclosure will be described in detail with reference to the accompanying drawings.

Figure 1:
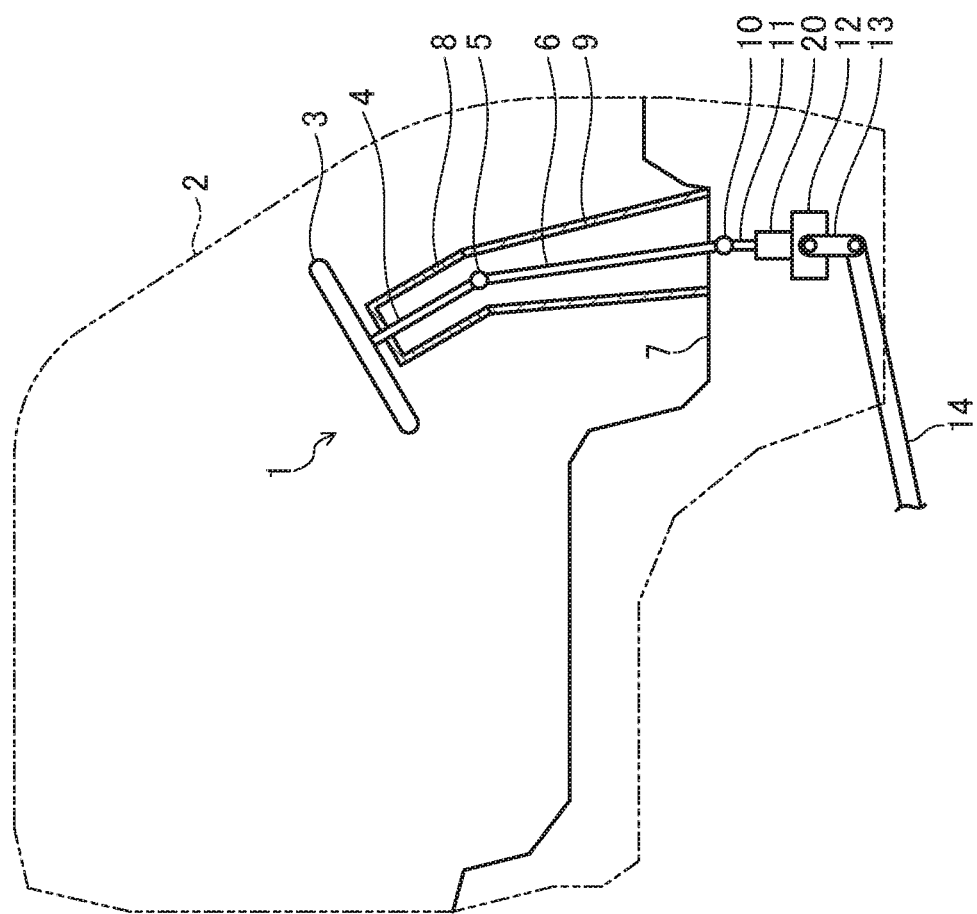
FIG. 1 schematically illustrates one example of a steering device according to an embodiment of the present disclosure.

Steering device 1 according to the present embodiment will be described with reference to FIG. 1. FIG. 1 schematically illustrates steering device 1 according to the present embodiment. In FIG. 1, FR indicates the front side of a vehicle, and UP indicates the upper side of the vehicle.

Steering device 1 is mounted on the vehicle provided with vehicle cabin 2. The vehicle is a cab-over type vehicle (for example, a truck, a bus, a van, or the like) provided with vehicle cabin 2 above an internal combustion engine (not illustrated).

Steering device 1 includes steering wheel 3, first steering shaft 4, first joint part 5, second steering shaft 6, second joint part 10, third steering shaft 11, power steering unit 12, pitman arm 13, drag link 14, and coaxial motor 20.

Steering wheel 3 is a device with which a driver performs a rotating operation for steering the vehicle.

First steering shaft 4 is a rotatable rod-like member, and is connected at one end to steering wheel 3 and connected at the other end to first joint part 5.

First joint part 5 couples first steering shaft 4 to second steering shaft 6 at a predetermined angle.

First steering shaft 4 is covered peripherally by a cylindrical upper cover (also referred to as a steering cowl) 8. Meanwhile, first joint part 5 is covered peripherally by a cylindrical lower cover (also referred to as a column cover or a column boot) 9. The upper end of lower cover 9 is connected to the lower end of upper cover 8, and the lower end of lower cover 9 is fixed to floor (bottom) 7 of vehicle cabin 2.

Second steering shaft 6 is a rotatable rod-like member, and includes a shaft (not illustrated) and a cylindrical member (not illustrated) surrounding the shaft, which are coupled together so as to be relatively slidable in the axial direction, making second steering shaft 6 extendible and retractable, for example.

Second steering shaft 6 is connected at one end to first joint part 5 and connected at the other end to second joint part 10 disposed below floor 7 (outside vehicle cabin 2). Specifically, the other end of second steering shaft 6 is inserted into an opening (not illustrated) formed in floor 7 and connected to second joint part 10.

Second joint part 10 couples second steering shaft 6 to third steering shaft 11 at a predetermined angle.

A portion of second steering shaft 6 located above floor 7 (portion located in vehicle cabin 2) is covered peripherally by lower cover 9.

Third steering shaft 11 is a rotatable rod-like member, and is connected at one end to second joint part 10 and connected at the other end to an input shaft (not illustrated) of power steering unit (also referred to as steering gearbox) 12. The input shaft of power steering unit 12 is arranged coaxially with third steering shaft 11.

The rotational force of steering wheel 3 is transmitted to power steering unit 12 via first steering shaft 4, second steering shaft 6, and third steering shaft 11.

Power steering unit 12 is disposed below floor 7 (in other words, outside vehicle cabin 2). This power steering unit 12 converts the rotational force transmitted as described above into a larger force that swings pitman arm 13. Thus, pitman arm 13 swings to push or pull drag link 14, so that wheels (not illustrated) are steered via knuckle arms and tie rods (both not illustrated).

Power steering unit 12 is hydraulic, for example, and two main and sub-system oil pumps (not illustrated) are connected to power steering unit 12 via one or more oil passages. Thus, even when the main oil pump fails, the sub oil pump is able to cope, so that the operation of power steering unit 12 is continued. Note that, an oil pump of a single system may also be connected to power steering unit 12. Note also that, power steering unit 12 is not limited to being hydraulic, and may also be electric.

Here, a description will be given of a characteristic configuration of the present embodiment.

In the present embodiment, coaxial motor 20 is provided directly above power steering unit 12 as shown in FIG. 1.

Coaxial motor 20 is attached to third steering shaft 11. An output shaft (not illustrated) of coaxial motor 20 is arranged coaxially with third steering shaft 11. Since the input shaft of power steering unit 12 is arranged coaxially with third steering shaft 11 as described above, it can be said that the output shaft of the coaxial motor 20 is arranged coaxially with the input shaft of power steering unit 12.

Coaxial motor 20 is driven under the control of an ECU (not illustrated) to apply the rotational force to third steering shaft 11. For example, when a driving assistance function is executed, the ECU drives coaxial motor 20 such that a predetermined level of rotational force is applied to third steering shaft 11 at a predetermined timing. Examples of the driving assistance function include automatic parking, lane keeping assist during cruise control, and the like.

The rotational force applied to third steering shaft 11 by driving of coaxial motor 20 is transmitted to power steering unit 12.

As described above, steering device 1 according to the present embodiment is characterized in that coaxial motor 20 is provided directly above power steering unit 12 (e.g., on third steering unit 11).

In steering device 1 according to the present embodiment, the oil pumps of two systems are connected to power steering unit 12, so that power steering unit 12 is resistant to failure. It is thus possible to employ a smaller motor with less output as coaxial motor 20. Consequently, it is possible to improve the operability of steering wheel 3, for example. In contrast, in the configuration of PTL 1 described above, since the motor functions to substitute for the failure of the power steering unit, a higher-power and larger-sized motor has to be employed. Accordingly, there is a problem that the operability of steering wheel 3 decreases.

The present disclosure is not limited to the above-described embodiments, and can be appropriately modified and implemented without departing from the spirit of the present disclosure. Hereinafter, each modification will be described.

Modification 1

Figure 2:
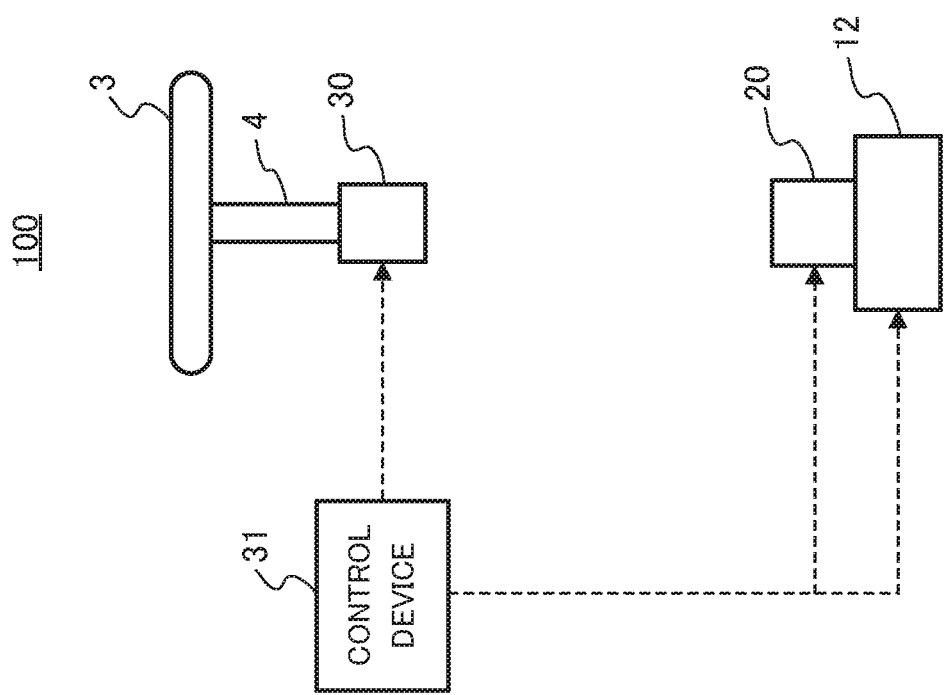
FIG. 2 schematically illustrates one example of a steering device according to a modification of the present disclosure.

The steering device of the present disclosure may be of a steer-by-wire system. This example will be described with reference to FIG. 2. FIG. 2 schematically illustrates one exemplary configuration of steering device 100 according to the present modification.

The same components between FIGS. 1 and 2 are provided with the same reference symbols. Further, illustration of floor 7 of vehicle cabin 2, pitman arm 13, and drag link 14 is omitted in FIG. 2. In addition, broken-line arrows indicate the flow of control signals in FIG. 2.

Steering device 100 includes reactive force motor 30 in addition to power steering unit 12 and coaxial motor 20 described in the embodiment. Power steering unit 12, coaxial motor 20, and reactive force motor 30 are each electrically connected to control device 31 and controlled on the basis of a control signal from control device 31.

In FIG. 2, steering wheel 3, first steering shaft 4, reactive force motor 30, and control device 31 are provided inside vehicle cabin 2 (see FIG. 1). Power steering unit 12 and coaxial motor 20 are provided outside vehicle cabin 2 (see FIG. 1). Control device 31 may also be provided outside vehicle cabin 2.

The output shaft of coaxial motor 20 is arranged coaxially with the input shaft of power steering unit 12. In addition, coaxial motor 20 is provided to be mechanically separated from first steering shaft 4 and reactive force motor 30.

One end of first steering shaft 4 is connected to steering wheel 3, and the other end is connected to reactive force motor 30.

Control device 31 calculates the rotational direction and the rotation amount on the basis of the torque and steering angle of steering wheel 3 detected by various sensors (not illustrated). Control device 31 then controls the driving of coaxial motor 20 and power steering unit 12 such that the calculated rotational direction and rotation amount are achieved.

Control device 31 also controls the driving of reactive force motor 30 such that a reactive force according to the calculated rotational direction and rotation amount is applied to first steering shaft 4.

Modification 2

The steering device of the present disclosure only have to include, as its minimum configuration, power steering unit 12 disposed below floor 7 of vehicle cabin 2, and coaxial motor 20 provided directly above power steering unit 12 and including the output shaft arranged coaxially with the input shaft of power steering unit 12.

Modification 3

Although the embodiment has been described in relation to the case where the vehicle on which steering device 1 is mounted is the cab-over type vehicle, the present disclosure is not limited to this example. Steering device 1 may also be mounted on a vehicle provided with an internal combustion engine in front of or behind vehicle cabin 2.

Summary of Disclosure

The steering device of the present disclosure is a steering device to be mounted on a vehicle, the steering device including: a power steering unit disposed below a floor of a vehicle cabin; and a coaxial motor provided directly above the power steering unit and including an output shaft arranged coaxially with an input shaft of the power steering unit.

The steering device described above may further include: a steering shaft connected at one end to a steering wheel and connected at the other end to the input shaft of the power steering unit, the steering wheel being disposed above the floor of the vehicle cabin, in which the output shaft of the coaxial motor may be arranged coaxially with the steering shaft.

In the steering device described above, the coaxial motor together with the power steering unit may be controlled by a control device such that a rotational direction and a rotation amount calculated on a basis of torque and a steering angle of the steering wheel are achieved.

In the steering device described above, the power steering unit may be hydraulic, and a plurality of oil pumps may be connected to the power steering unit.

This application is based on Japanese Patent Application No. 2017-165769, filed on Aug. 30, 2017, the disclosure of which is incorporated herein by reference in its entirety.

INDUSTRIAL APPLICABILITY

The steering device of the present disclosure is useful for a steering device of a vehicle.

REFERENCE SIGNS LIST

1,100 Steering device
2 Vehicle cabin
3 Steering wheel
4 First steering shaft
5 First joint part
6 Second steering shaft
7 Floor
8 Upper cover
9 Lower cover
10 Second joint part
11 Third steering shaft
12 Power steering unit
13 Pitman arm
14 Drag link
20 Coaxial motor
30 Reactive force motor
31 Control device

What is claimed is:

1. A steering device to be mounted on a vehicle, the steering device comprising:
    a power steering unit disposed below a floor of a vehicle cabin, the power steering unit including a gear structure that amplifies a rotational force input from an input shaft, and including an output shaft connected to a pitman arm that moves a drag link, the output shaft outputting the amplified rotational force to the pitman arm;
    a coaxial motor provided below the floor of the vehicle cabin and directly above the power steering unit and including an output shaft arranged coaxially with an input shaft of the power steering unit;
    a reactive force motor provided above the floor of the vehicle cabin to be mechanically separated from the coaxial motor to be mechanically unconnected with the coaxial motor;
    a steering shaft connected at one end to a steering wheel and connected at another end to the reactive force motor, the steering wheel being disposed above the floor of the vehicle cabin; and
    a control device that calculates a rotational direction and a rotation amount based on a torque and a steering angle of the steering wheel, controls the coaxial motor and the power steering unit to achieve the rotational direction and the rotation amount, and controls the reactive force motor to apply a reactive force to the steering shaft according to the rotational direction and the rotation amount.

2. The steering device according to claim 1, wherein the power steering unit is hydraulic, and a plurality of oil pumps are connected to the power steering unit, the plurality of oil pumps including a main oil pump that operates the power steering unit, and including a sub oil pump that is driven when the main oil pump fails.

3. A steering device to be mounted on a vehicle, the steering device comprising:
    a steering assembly; and
    a power steering assembly, wherein
    the steering assembly includes:
        a steering wheel operated by a driver;
        a steering shaft connected to the steering wheel; and
        a reactive force motor applied to the steering shaft, and
    the power steering assembly includes:
        a power steering unit including an output shaft connected to a pitman arm that moves a drag link, amplifying, by a gear structure, a rotational force applied to an input shaft and outputting the amplified rotational force from the output shaft to the pitman arm to convert the rotational force to a force to steer wheels; and
        a coaxial motor that has an output shaft connected to the input shaft of the power steering unit and that generates a rotational force on the output shaft based on torque and a steering angle of the steering wheel,
    wherein the steering assembly and the power steering assembly are mechanically separated from each other,
    wherein the steering assembly is provided inside a vehicle cabin of the vehicle above a floor of the vehicle cabin,
    wherein the power steering assembly is provided outside the vehicle cabin of the vehicle below the floor of the vehicle cabin, and
    wherein the output shaft of the coaxial motor is arranged coaxially with the input shaft of the power steering unit.

4. The steering device according to claim 3, wherein the power steering unit is hydraulic and connected to a plurality of oil pumps, the plurality of oil pumps including a main oil pump that operates the power steering unit, and including a sub oil pump that is driven when the oil pump fails.

5. The steering device according to claim 3, wherein the steering shaft is not mechanically connected to the coaxial motor.

* * * * *